United States Patent [19]

Carlson

[11] Patent Number: 5,068,018
[45] Date of Patent: * Nov. 26, 1991

[54] ELECTROPHORETIC FLUID COMPOSITE STRUCTURE

[75] Inventor: J. David Carlson, Cary, N.C.

[73] Assignee: Lord Corporation, Erie, Pa.

[*] Notice: The portion of the term of this patent subsequent to May 28, 2008 has been disclaimed.

[21] Appl. No.: 463,276

[22] Filed: Jan. 10, 1990

[51] Int. Cl.$^5$ .............................................. C25B 7/00
[52] U.S. Cl. ............................ 204/180.1; 204/299 R; 188/267; 267/140.1
[58] Field of Search ...................... 204/180.1, 299 R; 188/267; 267/140.1 E, 140.1 AE, 140.1 R

[56] References Cited

U.S. PATENT DOCUMENTS

| | | | |
|---|---|---|---|
| 3,255,853 | 6/1966 | Klass et al. | 192/21.5 |
| 4,782,927 | 11/1988 | Sproston et al. | 192/21.5 |
| 4,790,522 | 12/1988 | Drutchas | 267/225 |
| 4,896,754 | 1/1990 | Carlson et al. | 188/267 |
| 4,923,057 | 5/1990 | Carlson et al. | 188/378 |

FOREIGN PATENT DOCUMENTS

2111171 7/1985 United Kingdom .

Primary Examiner—John Niebling
Assistant Examiner—David G. Ryser
Attorney, Agent, or Firm—David L. McCombs; W. Graham Buie

[57] ABSTRACT

An apparatus and method for control of stiffness and damping in a flexible composite structure by the application of an electric field to an electrophoretic fluid forming part of the structure. The structure includes spaced, parallel, flexible layers of material which include confronting electrodes. The electrophoretic fluid is capable of separating into particle-rich and particle-deficient phases by electrophoresis and operates in surface contact with the layers. An electrically nonconductive material having raised surface areas and spaces between the surface areas is associated with one or more of the layers. When a voltage is applied between the layers in a first direction, the particle-rich phase of the fluid collects on one of the layers and also makes contact with the spaces and the raised surface areas of the material associated with the other layer thereby engaging or locking the layers together to increase the shear strength of the layers and thus the complex stiffness of the structure. When the voltage potential is applied in the opposite direction, the particle-rich phase migrates to the other layer and collects in the spaces between the raised surfaces of the material, thereby disengaging the layers to decrease their shear strength and thus the stiffness of the structure. The structure may be configured as a panel, plate, or beam, in association with a variety of mechanical systems.

19 Claims, 5 Drawing Sheets

ELECTROPHORETIC FLUID COMPOSITE STRUCTURE

FIELD OF THE INVENTION

The present invention relates in general to an apparatus and method for changing the flexibility of a composite structure, and, more particularly, relates to the use of an electrophoretic fluid in a composite structure for providing controllable stiffness and damping.

BACKGROUND OF THE INVENTION

The stiffness and damping characteristics of a flexible structure are usually fixed parameters which cannot be easily changed or controlled once fabrication of the structure is complete. Flexible structures which are used in dynamic mechanical systems may experience a wide range of input forces and it therefore may be necessary to adjust the response of the structure to satisfy certain operating requirements. For example, engineering applications in which it may be desirable to adaptively control the mechanical properties of a structure include, inter alia, the control of sound propagation and vibrations in aerospace and automotive applications, and flexible fixturing in advanced manufacturing and robotic manipulator systems. The variable control of structural behavior which is contemplated herein is to be distinguished from traditional damping arrangements, which typically operate as discrete couplings between portions of a structure, or between the structure and the source of mechanical disturbance. While a large variety of known damping systems can successfully control the motion of coupled members in many cases, discrete dampers are inherently inadequate to control the overall constitutive characteristics of flexible structures subjected to input disturbances or forces.

One approach to the control of the overall dynamic properties of a flexible structure which represents an improvement over localized damping systems is described in Hubbard, Jr., U.S. Pat. No. 4,565,940. A viscoelastic layer of material is applied to the flexible structure and is constrained by a piezoelectric film. The effect of the layer is to dissipate input vibrations or forces for improved damping characteristics. The damping effect can be variably controlled by adjusting the application of a voltage potential to the piezoelectric film to change its stiffness. However, active control of the mechanical properties of a structure using piezoelectric films and viscoelastic materials include numerous shortcomings. The viscoelastic material itself has static properties. Piezoelectric materials are expensive and generally are incapable of sustaining sufficient forces to allow for the adequate control of structures in most practical systems.

It may therefore be desirable to employ an electroactive fluid as a component of a flexible, composite structure to provide for variable and controllable mechanical properties. Electroactive fluids consist of suspensions of very fine particles in a dielectric liquid media. Electroactive fluids experience changes in their physical properties in the presence of an electric field, and for this reason are useful in a wide variety of mechanical treatments. One type of electroactive fluid is what is known as an electrorheological or "electroviscous" fluid. Electrorheological fluids are electroactive fluids which, in absence of an electric field, exhibit Newtonian flow characteristics such that their shear rate is directly proportional to shear stress. However, when an electric field on the order of $10^3$ V/mm is applied, a yield stress phenomenon occurs such that no shearing takes place until the shear stress exceeds a yield value which rises with increasing electric field strength. The result can appear as an increase in apparent viscosity of several orders of magnitude. Thus, the electrorheological fluid "thickens" into a solid or semisolid condition where the particles of the fluid form into fibrillated, "pearl-chain" like structures between the electrodes producing the electric field. While electrorheological fluids are beneficial in providing for rapid and reversible response characteristics with typical response times being on the order of one millisecond, the shear stress limits of electrorheological fluids are constrained by the voltage potential and volume of fluid required for their adequate performance in known mechanical applications.

Another type of electroactive fluid is an electrophoretic or "electroseparatable" fluid. Electrophoretic fluids are suspensions similar to electrorheological fluids but are characterized by a very different response to an applied electric field. The particles within electrophoretic fluids exhibit a very strong electrophoretic migration. Rather than forming, in the presence of an electric field, a fibrillated structure that has an induced yield strength, electrophoretic fluids separate into particle-rich and particle-deficient phases by electrophoresis. The electrophoretic induced separation can produce much larger shear strengths at lower operating voltages than electrorheological fluids. Electrophoresis is a linear phenomenon with respect to electric field strength, while in contrast, the strength of an electrorheological fluid varies with the square of the electric field because of the dependence on induced dipole interactions for the electrorheological effect. Further, once electrophoretic induced separation is accomplished, the resulting shear strength of an electrophoretic fluid can be maintained under a reduced electric field.

SUMMARY OF THE INVENTION

It is therefore an object of the present invention to provide an apparatus and method which utilizes an electrophoretic fluid as a component for controlling the mechanical properties of flexible composite structures.

It is a further object of the present invention to provide an apparatus and method of the above type in which parallel, flexible layers are utilized to confine an electrophoretic fluid in a defined space therebetween for forming a composite structure.

It is a further object of the present invention to provide an apparatus and method of the above type in which a particle-rich phase of the electrophoretic fluid produced by an electric field between the layers may be utilized to effect the shear strength between the layers for adjusting the complex stiffness (i.e., stiffness and damping) characteristics of the flexible structure.

It is a still further object of the present invention to provide an apparatus and method of the above type in which raised surfaces formed of an insulating material having spaces or openings therein are positioned between the layers for either receiving or engaging the particle-rich phase depending on the polarity of the electric field between the layers.

Toward the fulfillment of these and other objects, an apparatus and method is provided for controlling the mechanical properties of a flexible composite structure by the application of an electric field to an electrophoretic fluid forming part of the structure. The composite structure may be configured as a plate, panel, beam or bar, or assembly of such elements, including a stack of multiple layers in extended or distributed mechanical systems. The apparatus includes spaced, parallel, flexible layers of material which include confronting electrodes. An electrophoretic fluid is confined in the space between the layers. The electrophoretic fluid operates in surface contact with the layers and is capable of separating into particle-rich and particle-deficient phases by electrophoresis. Control of this process is used to reversibly "jam" or lodge the particle-rich phase of the fluid between relatively moving components of the structure for selectively changing the shear strength between the layers and thus altering the complex stiffness characteristics of the structure.

An electrically nonconductive material having raised surface areas and spaces between the surface areas is associated with one or more of the layers of the structure for effecting the coupling action between the layers. When an electric field is applied between the layers in a first direction, the particle-rich phase of the fluid collects on one of the layers and also makes contact with the spaces and the raised surface areas of the material associated with the other electrode, thereby engaging or "locking" the layers together. When the polarity of the applied electric field is reversed, the particle-rich phase migrates to the other layer by electrophoresis and collects in the spaces between the raised surface areas of the material, thereby disengaging the layers. The direction and intensity of the applied electric field may be varied for controlling the sequence and degree of coupling or force transmission between the layers thus adjusting the shear strength between the layers.

BRIEF DESCRIPTION OF THE DRAWINGS

For a better understanding of the invention, reference may be made to the following description of exemplary embodiments taken in conjunction with the figures of the accompanying drawings, in which.

DESCRIPTION OF THE PREFERRED EMBODIMENTS

Figure 1:
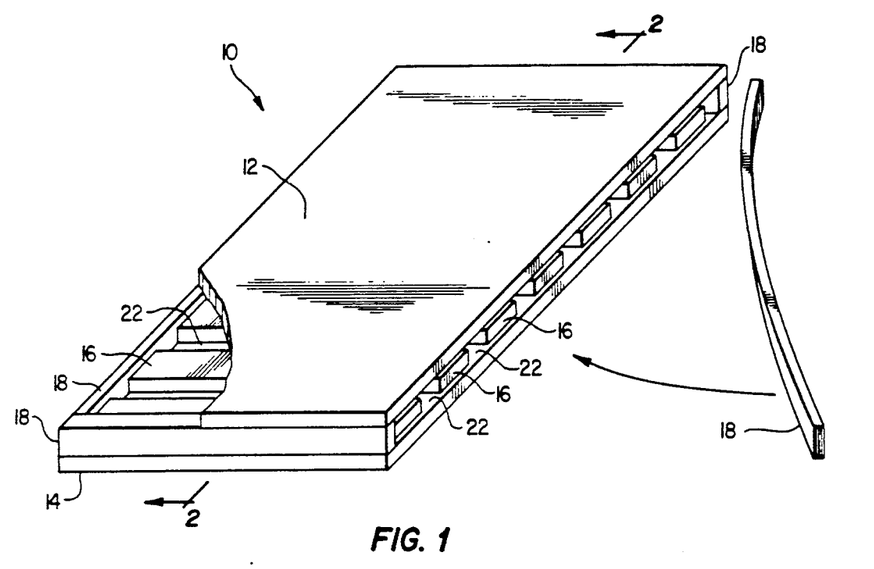
FIG. 1 is a partially broken away, perspective view of a composite structure apparatus of the present invention.

In FIG. 1 of the drawings, there is designated by the reference numeral 10 a composite structure which employs features of the present invention. The structure 10 includes upper and lower containment layers 12 and 14, and a plurality of ribs 16. For the purpose of clearly illustrating these components, the structure 10 is shown partially disassembled in FIG. 1. It is understood that when assembled, an electrophoretic fluid (not shown) is enclosed within the space between the layers 12 and 14, as will be subsequently discussed. The structure 10 is depicted as an isolated, generally rectangular panel. Although not shown, it is understood that the structure 10 may be incorporated in a wide variety of extended or distributed mechanical systems in association with other components for providing controllable structural behavior in such systems.

Figure 2:
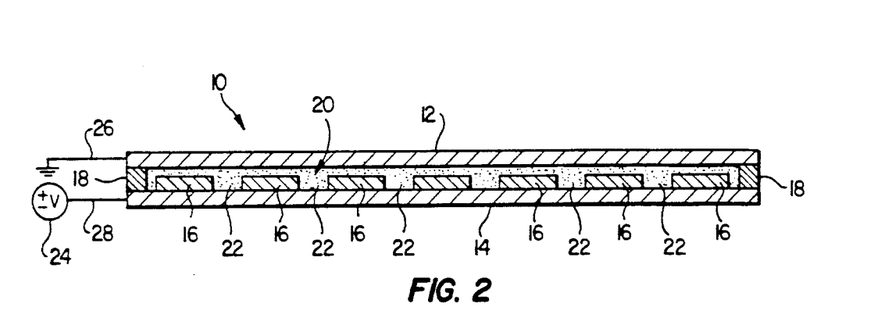
FIG. 2 is a cross-sectional view of the composite structure apparatus taken along line 2—2 of FIG. 1.

Referring to FIGS. 1 and 2, the layers 12 and 14 are parallel-spaced and are constructed of a flexible, conductive material such as a thin metal, a conductive plastic or an insulating material having a conductive coating on the inside surface. One or more support members 18 hold the layers 12, 14 in their spaced relationship about the periphery of the structure 10 and also operate to confine the electrophoretic fluid in the region between the layers. The members 18 may also be spaced throughout the structure 10 as necessary to maintain appropriate spacing of the layers 12, 14. The members 18 are flexible and made of an insulating material such as a silicon RTV sealant, a rubber, or a plastic that is bonded into place. The electrophoretic fluid is schematically illustrated in FIG. 2 by a dispersion of particles 20.

The ribs 16 are affixed to the lower layer 14 of the structure 10 and are constructed of a suitable nonconductive metal, plastic, ceramic, glass, epoxy, rubber or composite material. The ribs 16 prevent direct contact and electrical arcing between the layers 12, 14. Importantly, the ribs 16 also provide for controlled engagement and disengagement between the layers 12, 14 by the electrophoretic fluid, in a manner to be discussed. A plurality of spaces 22 separate adjacent ribs 16. Both the ribs 16 and the spaces 22 are oriented in the structure 10 so that their length is perpendicular to the direction of shear of the electrophoretic fluid during movement of the layers 12, 14 relative to each other. The ribs 16 have a thickness relative to the surface of the lower layer 14 which is typically a large fraction (e.g., 0.5–0.9) of the region between the upper and lower layers 12, 14.

A power source 24 is connected by wires 26, 28 to the layers 12, 14. Since the layers are electrically conductive the power source 24 is capable of providing a voltage potential between the layers. In this manner, the confronting surfaces of the layers 12, 14 operate as opposing electrodes for generating an electric field across the electrophoretic fluid, as will be described. In the preferred embodiment, the upper layer 12 is grounded and the lower layer 14 is at either a positive or negative high voltage with respect to the upper layer, as determined by the power source 24. It is understood that either of the layers 12, 14 may be at ground and further that the entire outside surface of the structure 10 may be insulated with a coating or by other means to prevent electrical shock.

The electrophoretic fluid contained in the region between the layers 12, 14 generally comprises a carrier liquid containing a dispersed particulate material that experiences electrophoresis in the presence of an electric field. One example of an electrophoretic fluid is a commercial dispersion of a polyvinylidene fluoride particles (PVF2) in dimethylphthalate and diisobutyl ketone. This is an example of a "positive" electrophoretic fluid, since the particulate material has a tendency to migrate to a positively charged electrode. Other electrophoretic fluid formulations are contemplated and may include "negative" electrophoretic fluids. Negative electrophoretic fluids are those in which the particulate material has a tendency to migrate to a negatively charged electrode.

During operation, the structure 10 is subjected to input forces or vibrations according to the particular application. The complex stiffness characteristics of the structure 10 ar adjustable in response to the input forces or vibrations by changing the shear strength of the layers 12, 14 relative to each other. The shear strength, or the ability of the layers 12, 14 to withstand input forces or vibrations which cause them to slide relative to each other, is determined by the force transmission between the layers. When forces are transmitted between the layers 12, 14 by the electrophoretic fluid, the layers remain relatively coupled and have a high shear strength or modulus. When the force transmission between the layers 12, 14 by the fluid is reduced, the layers are relatively uncoupled and have a lower shear strength or modulus. According to the present invention, the transmission of force between the layers 12, 14, and thus their shear strength and modulus or stiffness, is determined largely by the magnitude and direction of the electric field applied to the electrophoretic fluid in the region between the layers, as will be described. The support members 18 connecting the layers 12, 14 at their periphery limit the lateral movement of the layers and thus also provide a static contribution to their shear strength and modulus or stiffness.

Figures 3, 3A:
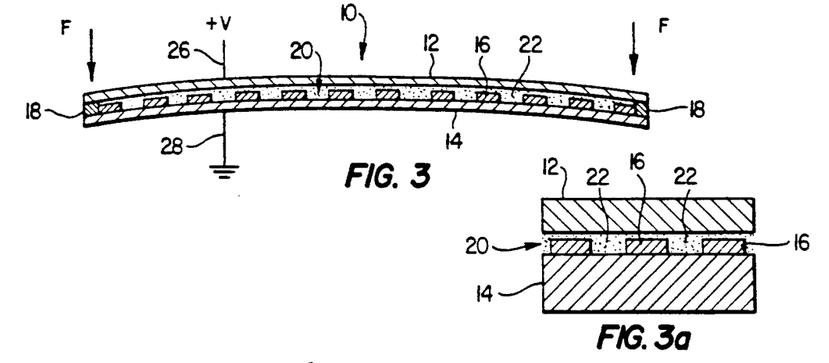
FIG. 3 is a cross-sectional view of the composite structure apparatus of FIG. 1 shown in a state of moderate stiffness.
FIG. 3a is an enlarged, cross-sectional, schematic view of a portion of the composite structure apparatus of FIG. 3.
Figures 4, 4A:
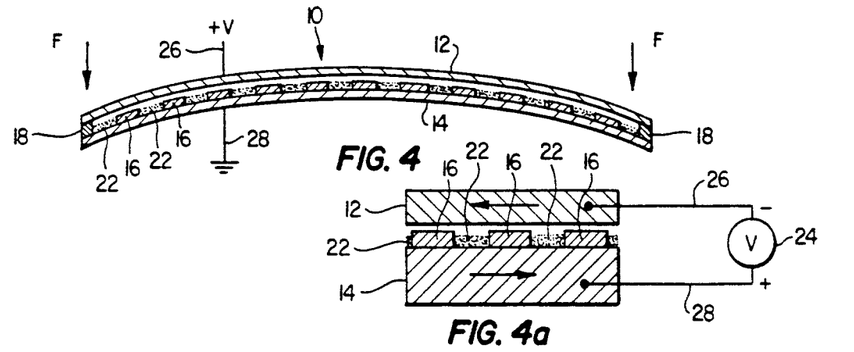
FIG. 4 is a cross-sectional, view of the composite structure apparatus of FIG. 1 shown in a state of low stiffness.
FIG. 4a is an enlarged, cross-sectional, schematic view of a portion of the composite structure apparatus of FIG. 4.
Figure 5:
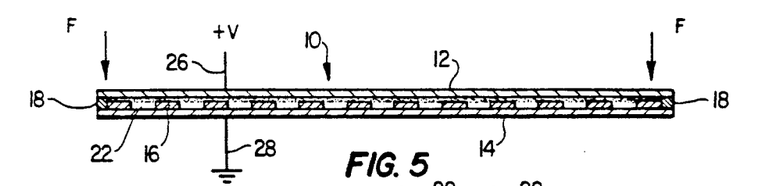
FIG. 5 is a cross-sectional view of the composite structure apparatus of FIG. 1 shown in a state of high stiffness.

FIGS. 3–5 schematically illustrate the use of the electrophoretic fluid in the region between the layers 12, 14 of the structure 10 to vary the shear strength of the layers relative to each other and thus the complex stiffness characteristics of the structure. Input forces (represented by the arrows "F") are applied perpendicular to the structure 10 which tend to bend the structure and thus cause the layers 12, 14 to slide or move slightly in the parallel plane relative to each other. As shown in FIGS. 3 and 3a, the electrophoretic fluid exists as a fairly homogeneous suspension of the particles 20 between the layers 12, 14 in the absence of an electric field (FIG. 3a). In its homogeneous, dispersed state the electrophoretic fluid will provide some degree of viscous coupling between the layers 12, 14 to transmit force between them and thus contribute to their shear strength. This contribution to the shear strength of the layers 12, 14 will produce only moderate overall stiffness characteristics and, as shown in FIG. 3, the structure 10 will bend in response to the input forces. Depending on the particular application and the viscosity of the fluid used, the foregoing stiffness characteristics may be ideal. Under other circumstances, it may be desirable to either decrease or increase the stiffness of the structure 10.

In FIGS. 4 and 4a, a voltage potential is applied to the electrophoretic fluid between the layers 12, 14 by the power source 24 for decreasing the shear strength of the layers, and thus reducing the complex stiffness characteristics of the structure 10. The power source 24 applies a positive voltage to the lower layer 14 so that the particles 20 (assuming a "positive" electrophoretic fluid) migrate by electrophoresis to the layer 14. The electrophoretic fluid in this manner separates into a particle-rich phase and a particle deficient phase as shown in FIG. 4a, where the particle-rich phase substantially fills the spaces 22 between the ribs 16. The particle-deficient phase is left to occupy the region between the raised surfaces of the ribs 16 and the upper layer 12. Because the particle-deficient phase is characterized by a reduced viscosity as compared to the fluid in the dispersed state (FIG. 3a), the layers 12, 14 are relatively free to move with respect to each other unencumbered by significant viscous coupling. Since the force transmission between the layers 12, 14 is thereby reduced, the structure 10 will bend easily in response to the input forces as shown in FIG. 4.

Figure 5A:
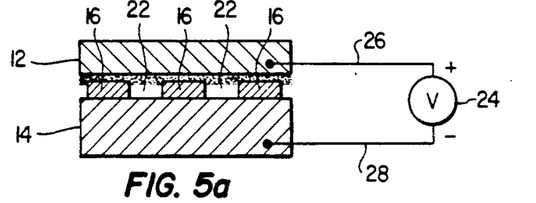
FIG. 5a is an enlarged, cross-sectional, schematic view of a portion of the composite structure apparatus of FIG. 5.

In FIGS. 5 and 5a, the polarity of the voltage applied by the power source 24 to the electrophoretic fluid between the layers 12, 14 is reversed for significantly increasing the shear strength of the layers and thus the stiffness of the structure 10. Since the positive voltage is now applied to the upper layer 12, the particles 20 of the fluid migrate by electrophoresis to the layer 12. The particle-rich phase of the fluid collects on the layer 12, leaving the particle-deficient phase to occupy a portion of the spaces 22 in surface contact with the lower layer 14. The particle-rich phase on the upper layer 12 also makes contact with the raised surfaces of the ribs 16 and "jams" or lodges in an outer portion of the spaces 22 between the ribs, thereby coupling the layers 12, 14. Thus, the electrophoretic fluid will transmit force between the layers 12, 14 by locking the layers relative to each other so that the structure 10 will not readily bend in response to the input forces. It is understood that the magnitude of the electric field generated by the power source 34 may be regulated to continuously vary the shear stiffness of the layers 12, 14 by the electrophoretic fluid and thus the stiffness characteristics of the structure 10.

It should be noted that a relatively high magnitude of electric field may be required to initially couple the layers 12, 14 but that a somewhat reduced magnitude electric field may be sufficient to maintain coupling of the layers.

Input forces, vibrations or disturbances in magnitude and direction other than as described in FIGS. 3-5 are also contemplated whereby the structure 10 will function in a similar manner to provide variable complex stiffness characteristics to achieve a desired result.

The geometry of the ribs 16 and the spaces 22 may be alternatively configured according to the performance requirements of the structure 10. The relative size and orientation of the ribs 16 and spaces 22, the applied voltage and the type of electrophoretic fluid used, may all be varied to meet particular system specifications. For example, the ribs and spaces need not be large. They may be very small, like the electrode patterns formed via vacuum thin film deposition techniques (masking, photolithography, photoetching, etc.) for application in reduced scale structures. The spaces 22 themselves may also be recessed in the layer 14 to eliminate the necessity for elevated ribs or for increasing the elevation of the ribs. The surface of the layer 12 opposite the ribs 16 may also be textured to enhance the locking strength of the particle-rich phase. In addition, the spacing or region between the layers 12, 14 may be varied.

FIGS. 6-10 illustrate modifications to the structure 10 in which the ribs 16 and the spaces 22 are replaced with alternative spaced, raised surfacing to operate in substantially the same manner as previously described with reference to FIGS. 3-5.

Figures 6, 6A:
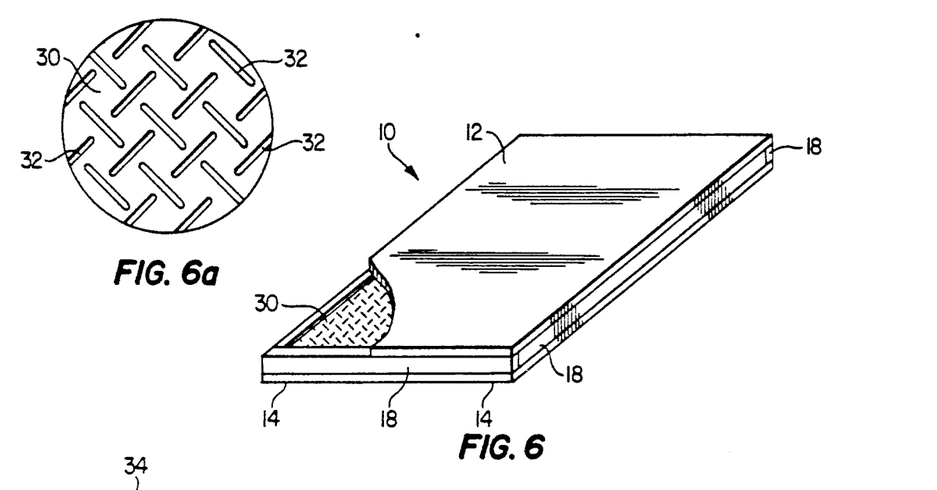
FIG. 6 is a perspective view similar to FIG. 1, but depicting an alternative embodiment of the composite structure apparatus of the present invention.
FIG. 6a is an enlarged view of a portion of the composite structure apparatus of FIG. 6.

In FIG. 6, an insulating material 30 is affixed to the layer 14 of the structure 10. According to the embodiment, the material 30 is a suitable nonconductive metal, plastic or composite material. The material 30 may be applied to the member 14 by adhesion, painting, casting, dipping, anodizing, printing, chemical vapor deposition or other suitable process. A plurality of discontinuous grooves 32 are included in the material 30 which extend to the surface of the layer 14 beneath the material. The grooves 32 are oriented in a generally criss-cross pattern. The grooves 32 may be preformed or formed by any variety of suitable techniques including machining, etching, grinding, drilling, etc. Although not shown, it is understood that, in operation, the particle-rich phase of the electrophoretic fluid will occupy the grooves 32 when attracted to the layer 14 by the induced electric field. The particle-deficient phase therefore occupies the region between the upper layer 12 and the surfaces of the material 30 thereby enhancing disengagement of the layers 12, 14 relative to each other to reduce the transmission of force between the layers. The shear strength of the layers 12, 14 and thus the stiffness of the structure 10 is reduced as previously described because of the reduction in the viscous coupling provided by the particle-deficient phase. Similarly, when increased complex stiffness characteristics are required the voltage between the layers 12, 14 is reversed and, as previously described, the particle-rich phase will migrate toward the upper layer 12. The particle-rich phase of the fluid on the upper layer 12 also engages the raised surfaces of the material 30 and lodges in the outer portion of the grooves 32, in a manner similar to that shown in FIG. 5a, for transmitting force between the layers 12, 14.

Figures 7, 7A:
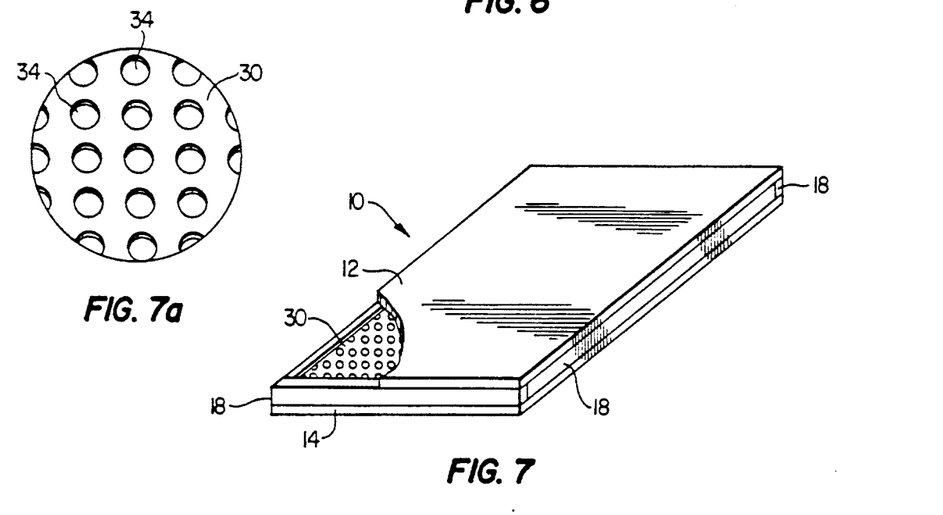
FIG. 7 is a perspective view similar to FIG. 1, but depicting another alternative embodiment of the composite structure apparatus of the present invention.
FIG. 7a is an enlarged view of a portion of the composite structure apparatus of FIG. 7.

In FIG. 7, the insulating material 30 is affixed to the layer 14 of the structure 10, as described above. According to this embodiment, a plurality of spaced circular holes 34 are included in the material 30 which extend to the surface of the layer 14 beneath the material. The circular holes 34 may be arranged in any suitable pattern and varied in size as desired. Other uniform geometric shapes for the holes 34 are also contemplated. Although not shown, it is understood that the particle-rich phase of the fluid will occupy the holes 34 when attracted to the layer 14 for decreasing the force transmission between the layer 12, 14 and thus their shear strength. Similarly, when increased shear strength is desired the voltage potential between the layers 12, 14 is reversed. The particle-rich phase of the fluid migrates to the layer 12 also engages the raised surfaces of the material 30 and lodges in an outer portion of the holes 34 for engagement of the layers 12, 14 relative to each other.

Figures 8, 8A:
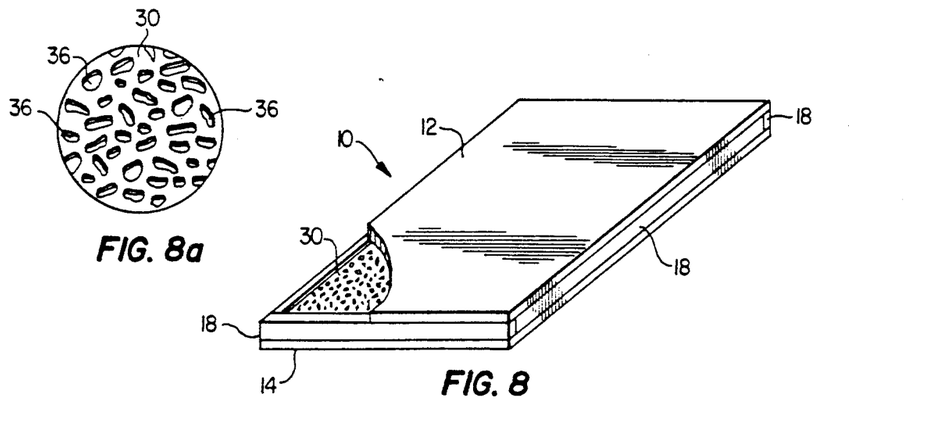
FIG. 8 is a perspective view similar to FIG. 1, but depicting another alternative embodiment of the composite structure apparatus of the present invention.
FIG. 8a is an enlarged view of a portion of the composite structure apparatus of FIG. 8.

In FIG. 8 the insulating material 30 is also affixed to the layer 14 of the structure 10, as described above. According to the embodiment, a plurality of irregular holes 36 are included in the material 30 which extend to the surface of the layer 14 beneath the material. The holes 36 may be formed by a course grit or palette blasting process that chips away small regions of the material 30, or by other techniques as described previously. Although not shown, it is understood that he particle-rich phase of the fluid will occupy the holes 36 when attracted to the layer 14 for decreasing the force transmission between the layers 12, 14 and thus their shear strength. Similarly, when the voltage potential is reversed the particle-rich phase of the fluid will migrate to the layer 12. The particle-rich phase on the layer 12 also engages the raised surfaces of the material 30 and lodges in an outer portion of the holes 36 for transmitting force between of the layers 12, 14 thereby increasing their shear strength.

Figure 9:
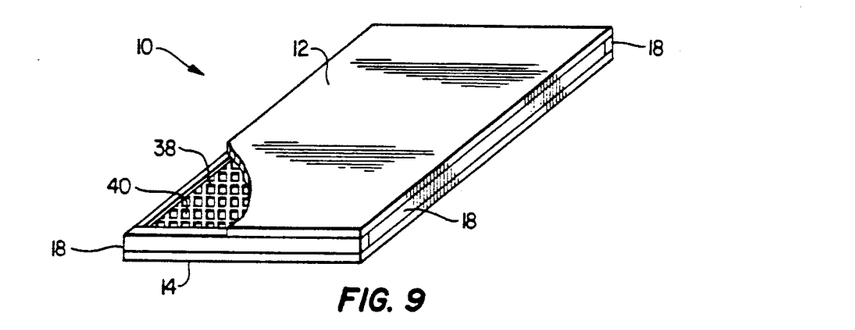
FIG. 9 is a perspective view similar to FIG. 1, but depicting another alternative embodiment of the composite structure apparatus of the present invention.

In FIG. 9, there is depicted an insulating grid 38 which may be separately formed of a single piece or mesh of insulating material and then affixed to the layer 14 of the structure 10. In the embodiment of FIG. 9, the grid 38 is constructed of a suitable nonconductive material having a plurality of holes 40 extending therethrough. The holes 40 may be formed by perforating the grid 38 or may be defined when the grid is made from a woven, open weave fabric or screen. A variety of sizes, arrangements and patterns for the holes 40 are contemplated. It is understood that the grid 38 is flexible and is affixed to the layer 14 by gluing, adhesive bonding, mechanical attachment or other means. Although not shown, during operation, the particle-rich phase of the fluid will occupy the holes 40 when attracted to the layer 14 for decreasing the shear strength of the layers 12, 14. When increased shear strength is desired, the polarity of the voltage potential between the layers 12, 14 is reversed and the particle-rich phase of the fluid migrates to the upper layer 12. The particle-rich phase on the layer 12 also engages the grid 38 and lodges in an outer portion of the holes 40 for transmitting force between the layers 12, 14.

Although not shown in the drawings, it is contemplated that for each of the described embodiments of the structure 10, the ribs 16, the insulating material 30 or the grid 38 may alternatively be affixed to the upper layer 12, or rigidly supported in the region between the layers 12, 14 and connected in a spaced relationship to either of the layers.

Figure 10:
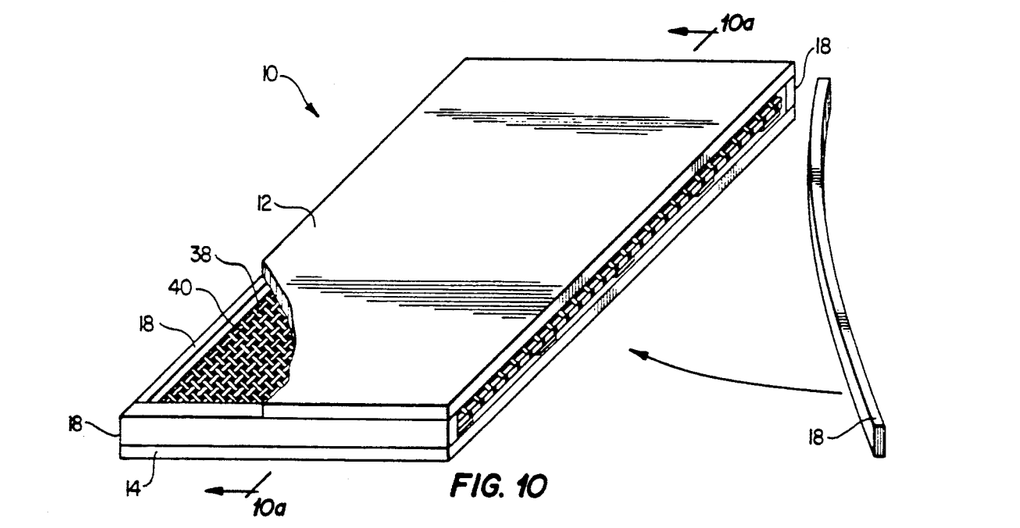
FIG. 10 is a perspective view similar to FIG. 1, but depicting another alternative embodiment of the composite structure apparatus of the present invention.
Figure 10A:
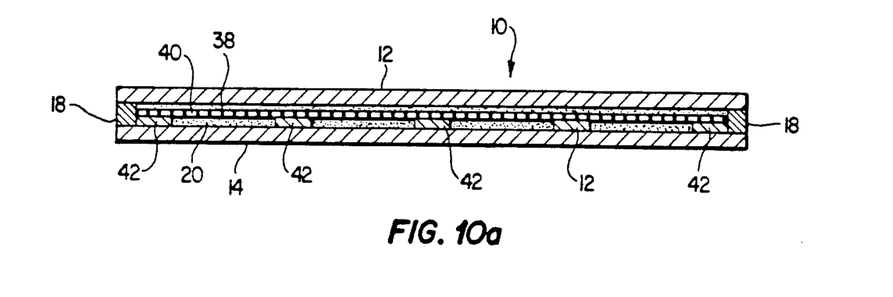
FIG. 10a is a cross-sectional view of the composite structure apparatus taken along line A—A of FIG. 10.

In FIGS. 10 and 10a, for example, the grid 38 of the structure 10 is spaced between the layers 12, 14 and is supported by retaining members 42 which rigidly connect the grid to the layer 14. Since the grid 38 is spaced away from the layer 14, additional room is provided for the particle-rich phase of the fluid to occupy the region between the grid and the layer 14 when a decrease in shear strength of the layers 12, 14 is desired. Thus, when the particle-rich phase of the fluid is attracted to the layer 14, the particles 20 will pass through the holes 40 of the grid 38 and fill the region between the grid and the layer 14, and the particle-deficient phase of the fluid will fill the region between the grid and the layer 12, thus minimizing the shear strength of the layers relative to each other. When the polarity of the voltage potential between the layers 12, 14 is reversed so that the particle-rich phase collects on the upper layer 12, a portion of the particle-rich phase on the layer 12 will make contact with the raised surfaces of the grid 38 and will lodge in at least an outer portion of the holes 40 thus engaging the upper layer and grid. Since the grid 38 is attached by the members 42 to the layer 14, the shear strength between the layers 12, 14 is increased.

Figure 11:
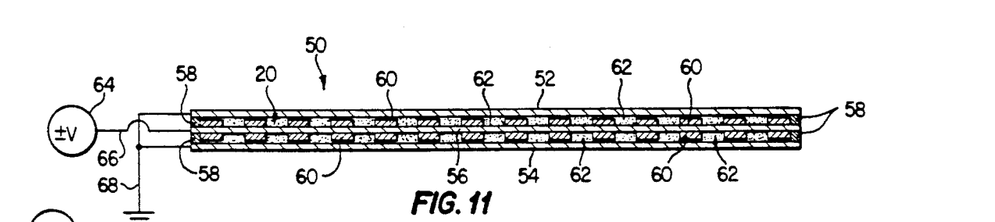
FIG. 11 is a vertical cross-sectional view of another alternative embodiment of the composite structure apparatus of the present invention having three flexible layers.

As shown in FIG. 11 of the drawings, the reference numeral 50 refers to an alternative electrophoretic fluid composite structure embodying principles of the present invention. The structure 50 includes an upper layer 52, a lower layer 54 and a partition 56 between the layers. The structure 50 is shown as a generally rectangular, laminar panel. An electrophoretic fluid represented by the particles 20 is enclosed within an upper region between the partition 56 and the upper layer 52, and also in a lower region between the partition and the lower layer 56. As discussed previously with reference to the structure 10, it is understood that the structure 50 also may be incorporated in a wide variety of distributed mechanical systems in association with other components for providing controllable structural behavior in such systems.

The layers 52, 54 and the partition 56 are parallel-spaced and are constructed of a flexible, conductive material such as a thin metal, a conductive plastic or an insulating material having a conductive coating on the surface or surfaces in contact with the electrophoretic fluid. Support members 58 hold the layers 52, 54 and the partition 56 in their spaced relationship and also operate to confine the electrophoretic fluid in the upper and lower regions between the partition and the upper and lower layers. The members 58 are flexible and made of an insulating material such as a silicon RTV sealant, a rubber, or a plastic that is bonded into place.

A plurality of ribs 60 are affixed to the upper and lower surfaces of the partition 56 and are constructed of a suitable nonconductive metal, plastic or composite material. The ribs 60 prevent direct contact and electrical arcing between the partition 56 and the upper and lower layers 52, 54. The ribs 60 also provide for controlled engagement and disengagement between the partition 56 and each of the layers 52, 54 by the electrophoretic fluid. A plurality of spaces 62 separate adjacent ribs 60. Both the ribs 60 and the spaces 62 are oriented in the structure 50 so that their length is perpendicular to the direction of shear of the electrophoretic fluid during movement of the layers 52, 54 relative to the partition 56. The ribs 60 have a thickness relative to the surface of the partition 56 which is typically a large fraction (e.g. 0.5-0.9) of the upper and lower regions between the layers 52, 54.

A power source 64 is connected by wires 66, 68 to the partition 56 and the layers 52, 54 respectively. Since the layers 52, 56 and the partition 58 are electrically conductive, the power source 64 is capable of providing a voltage potential between the partition and each of the layers. In this manner, the confronting surfaces of the partition 56 and each of the layers 52, 54 operate as opposing electrodes for generating an electric field across the electrophoretic fluid. In the preferred embodiment, the layers 52, 54 are grounded and the partition 56 operates at either a positive or negative high voltage with respect to the layers, according to the power source 64.

During operation, the structure 50 is subjected to input forces or vibrations according to the particular application. The complex stiffness characteristics of the structure 50 are adjustable by application of an electric field to the electrophoretic fluid in the same manner as previously discussed with reference to the structure 10. However, the structure 50 allows for laminar control of the force transmission and thus the shear strength between the partition 56 and both of the layers 52, 54 to provide for additive contributions to the overall complex stiffness of the structure. The power source 64 may also be configured to provide for independent control of the shear strength between the partition and each of the layers 52, 54.

Figure 12:
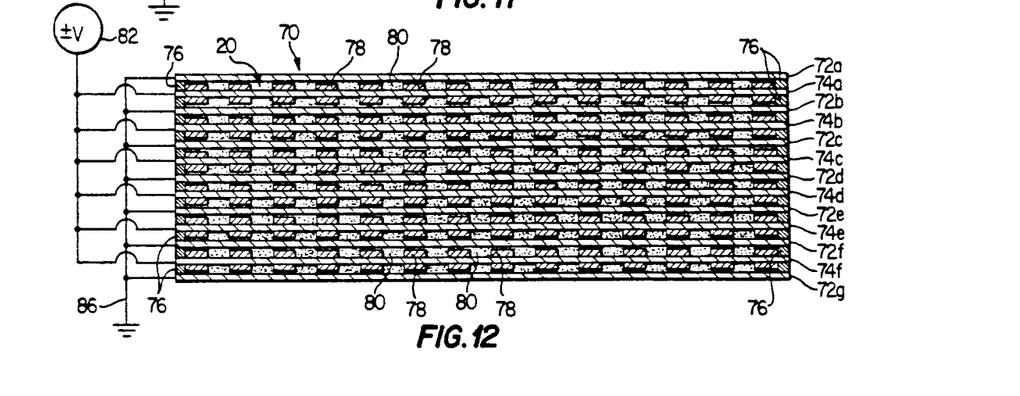
FIG. 12 is a vertical cross-sectional view of another alternative embodiment of the composite structure apparatus of the present invention having multiple flexible layers.

In FIG. 12 of the drawings, the reference numeral 70 refers to another electrophoretic fluid composite structure which embodies principles of the present invention. The structure 70 is similar to the structure 50, but provides additional controllable laminae to form a generally rectangular, bulk composite. The structure 70 includes multiple containment layers 72a-72g disposed in a parallel, spaced relationship. Multiple partitions 74a-74f are provided between adjacent ones of the containment layers 72a-72g, respectively. An electrophoretic fluid represented by the particles 20 is enclosed within the regions between each of the partitions 74a-74f and the layers 72a-72g. The structure 70 may be incorporated in a wide variety of mechanical systems as previously discussed with reference to the other embodiments.

Support members 76 hold the layers 72a-72g and the partitions 74a-74f in their spaced relationship and operate to confine the electrophoretic fluid, in the manner previously discussed with reference to the other embodiments. A plurality of ribs 78 are affixed to the upper and lower surfaces of each of the partitions 74a-74f. The ribs 78 prevent direct contact and electrical arcing between the partitions 74a-74f and the layers 72a-72f. The ribs also provide for controlled engagement and disengagement between the respective partitions 74a-74f, and each of the corresponding layers 72a-72g by the electrophoretic fluid, in the same manner as previously discussed. A plurality of spaces 80 separate each of the adjacent ribs 78. Both the ribs 78 and the spaces 80 are oriented in the structure 70 so that their length is perpendicular to the direction of movement of the layers 72a-72g relative to the partitions 74a-74f.

A power source 82 is connected by wires 84, 86 to each of the layers 72a-72g and the partitions 74a-74f, respectively. Since the layers 72a-72g and the partitions 74a-74f are electrically conductive, the power source 82 is capable of providing a voltage potential between the partitions and each of the corresponding layers. In this manner, the confronting surfaces of the partitions 74a-74f and each of the layers 72a-72g operate as opposing electrodes for generating an electric field across the electrophoretic fluid.

During operation, the structure 70 is subjected to input forces or vibrations according to the particular application. The complex stiffness characteristics of the structure 70 are adjustable by application of an electric field to the electrophoretic fluid in the same manner as previously discussed with reference to the other embodiments. However, the structure 70 allows for laminar control of the shear strength between each of the partitions 74a–74f and the corresponding layers 72a–72g for either independent or additive contributions to the overall complex stiffness of the structure.

Although not shown, it is understood that ribs of the structures 50 and 70 may be replaced with an insulating material or grid configured in manner similar to the embodiments previously discussed. Different arrangements may be contemplated for different laminae of each structure. Also, the number of the layers 72 and the corresponding partitions 74 may be varied.

While the structures 10, 50 and 70 are shown in the drawings as isolated, generally rectangular panels, it is understood that the structures may be alternatively configured. The structures may be curved or generally planar and conform to any desired shape or size according to the application. The structures may be incorporated as a portion of a device or mechanical assembly. Multiple structures may be placed in a contiguous relationship to provide for regional or patterned control of a particular mechanical assembly.

Figure 13A:
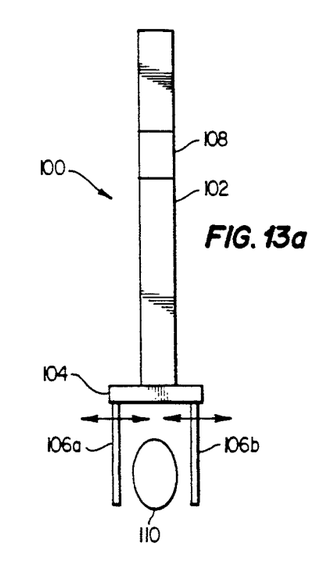
FIGS. 13a-13b depict the operation of a gripper assembly employing composite structures of the present invention.
Figure 13B:
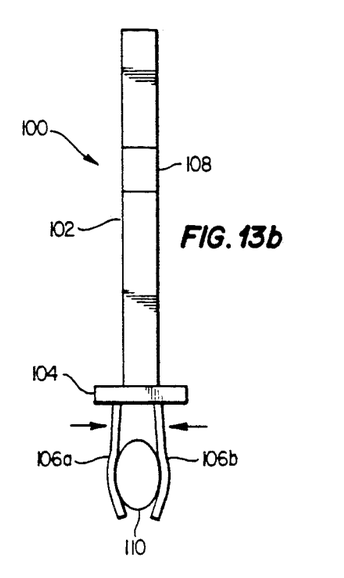

In FIGS. 13a–13b, there is designated by the reference numeral 100 a robot manipulator which includes as components thereof the composite structures of the present invention. The manipulator 100 includes a robot "arm" 102, a movable robot "hand" 104 and robot "fingers" 106a, 106b. While not shown in the drawings, the manipulator 100 includes a conventionally driven supporting structure by which the arm 102 is supported, moved and controlled as desired.

The arm 102 is constructed of a suitable rigid metal, plastic or composite material and is connected between the supporting structure (not shown) and the hand 104. A section 108 of the arm 102 is constructed of a composite structure employing features of the present invention, such as, for example, the structure 70 (previously described). The section 108 allows the arm 102 to bend when necessary and prevents the transmission of vibrations through the arm to the hand 104, as will be discussed. The hand 104 is positioned on the distal end of the arm 102 and is axially rotatable relative to the arm. The fingers 106a, 106b are connected to the hand 104 and are constructed of a flexible composite structure employing features of the present invention, such as, for example, an embodiment of the structure 10 (previously described). The fingers 106a, 106b are capable of moving in the direction of the arrows (FIG. 13a) for receiving and grasping a representative object 110. While not shown in the drawings, the section 108 and the fingers 106a, 106b are connected by wiring to a power source for selectively applying a voltage potential to the electrophoretic fluid (not shown) enclosed within the section and the fingers, as necessary for the control of the complex stiffness of these components.

During operation, the manipulator 100 is used for performing a task with respect to the object 110 and/or for moving the object to another location. In certain applications, the procedures to be performed by the manipulator 100 are delicate and must be accomplished efficiently yet without damaging the object or the surrounding environment. As shown in FIG. 13a, the supporting structure (not shown) positions the arm 102 in proximity to the object 110. The fingers 106a, 106b are in an extended and spread apart position for receiving the object 110. An electric field is applied to the portion 108 as necessary to maintain the arm 102 in a rigid state as it is moved into a position. However, it may be desirable to adjust the complex stiffness characteristics of the portion 108 to control resonances, vibrations or the flexibility of the arm 102 for improving trajectory following, end-point accuracy and settling time in reaching the object 110 or in performing other tasks. As a safety feature, the arm 102 could also be given maximum bending strength by the portion 108. The maximum bending strength or point at which the portion 108 would yield in response to an applied force could be controlled such that if a given load on the arm 102 were exceeded, the arm would bend rather than causing harm to any surrounding objects or equipment.

In FIG. 13b, the fingers 106a, 106b are moved together by the hand 104 to grasp the object 110. The fingers 106a, 106b are adjusted by application of the electric field to the electrophoretic fluid (not shown) in the fingers to a state of maximum flexibility so that they can easily bend to conform to the shape of the object 110 as the fingers grasp the object. Once in position, the electric field applied to the fingers 106a, 106b is adjusted, so that the fingers lock in place in position about the object 110. In the relatively rigid state, the fingers 106a, 106b have secured the object 110 and the manipulator 100 may move it or perform other tasks. The object 110 may be released by again transforming the fingers 106a, 106b to the flexible state.

The possible applications for composite structures which employ features of the present invention are numerous. The described composite structures would be particularly useful for controlling resonant vibrational characteristics or sound propagation in vehicle bodies and aircraft fuselages, as well as in suspension, drive train and engine components of such devices. Damping and vibration control for other moving mechanical systems and machinery is also contemplated. The composite structures of the present invention may also applied to the control of stiffness, bending and movement in manufacturing, robotic and other mechanical applications. The composite structures of the present invention may also be employed in holding, gripping, fixturing and similar applications. A latitude of modification, change and substitution is therefore intended in the foregoing disclosure and in some instances, some features of the invention will be employed without a corresponding use of other features. Accordingly, it is appropriate that the appended claims be construed broadly and in a manner consistent with the scope of the invention.

What is claimed is:

1. An apparatus for controlling the transmission of force between conductive layers of a flexible, composite structure to determine its stiffness characteristics, said apparatus comprising at least two of said layers disposed in a spaced relationship, means for supporting said layers in said spaced relationship, an electrophoretic fluid disposed in a space between said layers for transmitting force between first and second ones of said layers in directions parallel to said layers and being capable of separating into a particle-rich phase and a particle-deficient phase in the presence of an electric field, means for applying an electric field between said layers and to said fluid to separate said fluid into said particle-rich phase and said particle-deficient phase, said particle-rich phase migrating to one or the other of said layers depending on the direction of application of said electric field, means for forming a plurality of spaced and electrically insulating raised surfaces on one of said layers so that during application of said electric field in one direction said particle-rich phase collects on the other of said layers and extends between said other layer and said spaced raised surfaces to transmit a selected force between said layers, and during application of said electric field in the other direction, said particle-rich phase of said fluid migrates to said one layer and collects in spaces between said raised surfaces to substantially reduce said force transmission.

2. The apparatus according to claim 1 wherein upon application of said electric field in said one direction said particle-rich phase collected on said other layer lodges in at least an outer portion of said spaces between said raised surfaces for transmitting said force between said layers.

3. The apparatus according to claim 1 wherein said means for forming a plurality of spaced raised surfaces comprises an electrically nonconductive material.

4. The apparatus according to claim 1 wherein said means for forming a plurality of spaced raised surfaces comprises a plurality of rib members.

5. The apparatus according to claim 4 wherein said rib members are oriented perpendicular to the direction of fluid shear during parallel movement of said layers relative to each other.

6. The apparatus according to claim 1 wherein said means for forming a plurality of spaced raised surfaces comprises a grid.

7. The apparatus according to claim 1 wherein said means for forming a plurality of spaced raised surfaces comprises an insulating material having a plurality of grooves.

8. The apparatus according to claim 1 wherein said means for forming a plurality of spaced raised surfaces comprises an insulating material having a plurality of openings.

9. The apparatus according to claim 8 wherein said openings are circular in shape.

10. The apparatus according to claim 8 wherein said openings are irregular in shape.

11. The apparatus according to claim 1 wherein said force transmission may be varied in proportion to the strength of said electric field applied to said electrophoretic fluid.

12. The apparatus according to claim 1 wherein said composite structure comprises at least a portion of the arm of a robot manipulator.

13. The apparatus according to claim 1 wherein said composite structure comprises the fingers of a robot manipulator.

14. An apparatus for controlling the transmission of force between conductive layers of a flexible, composite structure to determine its stiffness characteristics, said apparatus comprising at least two of said layers disposed in a spaced relationship, at least one partition disposed in a spaced relationship between said layers, means for supporting said layers and said partition in said spaced relationship, an electrophoretic fluid disposed in spaces between said partition and each of said layers for transmitting force between said partition and one or both of said layers in directions parallel to said layers, said fluid capable of being separated into a particle-rich phase and a particle-deficient phase in the presence of an electric field, means for applying an electric field to said fluid between said partition and one or both of said layers to separate said fluid into said particle-rich phase and said particle-deficient phase, said particle-rich phase migrating to one or the other of said partition and one or both of said layers depending on the direction of application of said electric field, means for forming a plurality of spaced and electrically insulating raised surfaces on both sides of said partition so that during application of said electric field in one direction said particle-rich phase collects on one or both of said layers and extends between one or both of said layers and said spaced raised surfaces on one or both of said layers to transmit a predetermined force between said partition and one or both of said layers, and during application of said electric field in the other direction, said particle-rich phase of said fluid migrates to one or both sides of said partition and collects in spaces between said raised surfaces to substantially reduce said force transmission between said partition and one or both of said layers.

15. The apparatus according to claim 14 comprising multiple partitions disposed respectively between adjacent pairs of said layers for forming a composite structure having multiple, independently controllable laminae.

16. The apparatus according to claim 14 wherein said means forming a plurality of spaced raised surfaces comprise a plurality of rib members.

17. The apparatus according to claim 14 wherein said means forming a plurality of spaced raised surfaces comprises an insulating material having a plurality of openings.

18. A method for controlling the stiffness of a composite structure having spaced, parallel conductive layers, said method comprising the steps of placing an insulating material having spaced raised surfaces on at least one of said layers, confining an electrophoretic fluid in a space between said layers, said fluid being separatable into particle-rich and particle-deficient phases in the presence of an electric field, and applying an electric field to said fluid a first direction for causing said particle-rich phase to collect on one of said layers and engage the spaced raised surfaces of another of said layers, thereby coupling said layers and increasing the stiffness of said structure 19. The method according to claim 18 further comprising the step of applying an electric field to said fluid between said layers in a second direction for causing said particle-rich phase to collect in the spaces between said raised surfaces on the other of said layers leaving said particle-deficient phase in contact with said one layer, thereby decoupling said layers and decreasing the stiffness of said structure.

* * * * *

UNITED STATES PATENT AND TRADEMARK OFFICE
CERTIFICATE OF CORRECTION

PATENT NO. : 5,068,018
DATED : November 26, 1991
INVENTOR(S) : J. David Carlson It is certified that error appears in the above-identified patent and that said Letters Patent is hereby corrected as shown below:

Column 5, line 47, change "ar" to -- are --.

Column 8, line 12, change "layer" to -- layers --.

Column 10, line 51, change "72a-72f" to -- 72a-72g --.

Signed and Sealed this

Twenty-fifth Day of May, 1993

Attest:

MICHAEL K. KIRK

*Attesting Officer*    Acting Commissioner of Patents and Trademarks